(12) United States Patent
Li et al.

(10) Patent No.: US 10,116,719 B1
(45) Date of Patent: Oct. 30, 2018

(54) CUSTOMIZED DASH MANIFEST

(71) Applicant: Amazon Technologies, Inc., Seattle, WA (US)

(72) Inventors: Lei Li, Kirkland, WA (US); Mushegh Malkhasyan, Redmond, WA (US); Samuel James Van Pelt, Seattle, WA (US); Amarsingh Buckthasingh Winston, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 117 days.

(21) Appl. No.: 15/173,495

(22) Filed: Jun. 3, 2016

(51) Int. Cl.
| | | |
|---|---|---|
| *G06F 15/167* | (2006.01) | |
| *H04L 29/06* | (2006.01) | |
| *H04L 29/08* | (2006.01) | |

(52) U.S. Cl.
CPC ........ *H04L 65/601* (2013.01); *H04L 65/4069* (2013.01); *H04L 67/02* (2013.01); *H04L 67/06* (2013.01)

(58) Field of Classification Search
CPC ....... H04L 65/601; H04L 67/06; H04L 67/02; H04L 65/4069
See application file for complete search history.

(56) References Cited

U.S. PATENT DOCUMENTS

| | | | |
|---|---|---|---|
| 8,621,044 B2 | 12/2013 | Sood et al. | |
| 8,626,870 B2 | 1/2014 | Xu et al. | |
| 8,661,075 B2 | 2/2014 | Smith et al. | |
| 8,677,428 B2 | 3/2014 | Lewis et al. | |
| 8,806,050 B2 | 8/2014 | Chen et al. | |
| 8,849,950 B2 | 9/2014 | Stockhammer et al. | |
| 8,996,547 B2 | 3/2015 | Bocharov et al. | |
| 9,125,073 B2 | 9/2015 | Oyman et al. | |
| 9,143,543 B2 | 9/2015 | Falvo | |
| 9,332,051 B2 | 5/2016 | Brueck et al. | |
| 9,338,209 B1 * | 5/2016 | Begen .................. | H04L 65/601 |
| 9,344,472 B2 | 5/2016 | Cheng | |
| 9,544,388 B1 | 1/2017 | Li et al. | |
| 9,712,860 B1 | 7/2017 | Bordenet et al. | |
| 9,794,360 B1 | 10/2017 | Farhangi et al. | |
| 2012/0042090 A1 | 2/2012 | Chen et al. | |
| 2012/0096083 A1 | 4/2012 | Teng et al. | |
| 2012/0221741 A1 | 8/2012 | Froejdh et al. | |
| 2012/0259946 A1 | 10/2012 | Stockhammer et al. | |
| 2012/0317303 A1 | 12/2012 | Wang | |

(Continued)

OTHER PUBLICATIONS

Rainer et al., "A Seamless Web Integration of Adaptive Http Streaming", InSignal Processing Conference (EUSIPCO), 2012 Proceedings of the 20th European, IEEE, Aug. 27, 2012, pp. 1519-1523.

(Continued)

*Primary Examiner* — Michael A Keller
(74) *Attorney, Agent, or Firm* — Kilpatrick Townsend & Stockton LLP

(57) ABSTRACT

Methods and apparatus are described for generating manifest files for media content playback. A server can generate manifest files that include initialization metadata obtained from initialization fragments of media content files. Client devices can initiate playback of media content for playback using the manifest files without downloading or parsing the initialization fragments of the media content files.

25 Claims, 10 Drawing Sheets

(56) References Cited

U.S. PATENT DOCUMENTS

| | | | |
|---|---|---|---|
| 2013/0007223 A1* | 1/2013 | Luby | H04N 21/23106 709/219 |
| 2013/0173737 A1 | 7/2013 | Liu et al. | |
| 2014/0089398 A1* | 3/2014 | Zhang | H04N 13/0059 709/203 |
| 2015/0026358 A1 | 1/2015 | Zhang et al. | |
| 2015/0100702 A1 | 4/2015 | Krishna et al. | |
| 2015/0195328 A1 | 7/2015 | Rehan et al. | |
| 2015/0215359 A1 | 7/2015 | Bao et al. | |
| 2015/0237166 A1* | 8/2015 | Denoual | H04L 67/42 709/217 |
| 2015/0381690 A1 | 12/2015 | Schmidt et al. | |
| 2016/0094614 A1 | 3/2016 | Ulupinar et al. | |
| 2016/0205158 A1 | 7/2016 | Lo et al. | |
| 2016/0337426 A1 | 11/2016 | Shribman et al. | |
| 2017/0156015 A1* | 6/2017 | Stockhammer | H04S 3/006 |
| 2018/0103286 A1 | 4/2018 | Yang et al. | |

OTHER PUBLICATIONS

Seema et al., "WVSNP-DASH: Name-Based Segmented Video Streaming", IEEE Transactions on Broadcasting, vol. 61, No. 3, Sep. 2015, pp. 346-355.

Li et al., U.S. Appl. No. 15/173,499, titled Manifest Segmentation.

Li, et al., U.S. Appl. No. 15/888,410, filed Feb. 5, 2018, titled Manifest Partitioning.

Appelquist , "Virtualization of Video Streaming Functions", Diss. Ph.D. Dissertation. Saarland University, Apr. 26, 2016, 72 pages.

Bouzakaria et al., "Overhead and Performance of Low Latency Live Streaming Using MPEG-DASH", Information, Intelligence, Systems and Applications, IISA 2014, The 5th International Conference, IEEE., Jul. 7, 2014, pp. 92-97.

\* cited by examiner

CUSTOMIZED DASH MANIFEST

CROSS-REFERENCE TO RELATED APPLICATIONS

This application is related to and incorporates by reference for all purposes the full disclosure of co-pending U.S. patent application Ser. No. 15/173,499, filed Jun. 3, 2016, titled "MANIFEST SEGMENTATION".

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at providing media content quickly and reliably to consumers.

Media content (e.g., movies, television shows, videos, music, and electronic books) is often streamed over networks using adaptive bitrate streaming for playback on a viewer's device. Adaptive bitrate streaming includes determining a user's device bandwidth and hardware resources (e.g., available central processing unit (CPU) capacity) in real time and adjusting the quality of the media content that is requested and played back on the user's device to account for changes in the bandwidth and hardware resources. Fragments at different quality levels, or bitrates, of the media content detailed in a manifest file are requested individually and stored in a buffer for playback.

DETAILED DESCRIPTION

Figure 1:
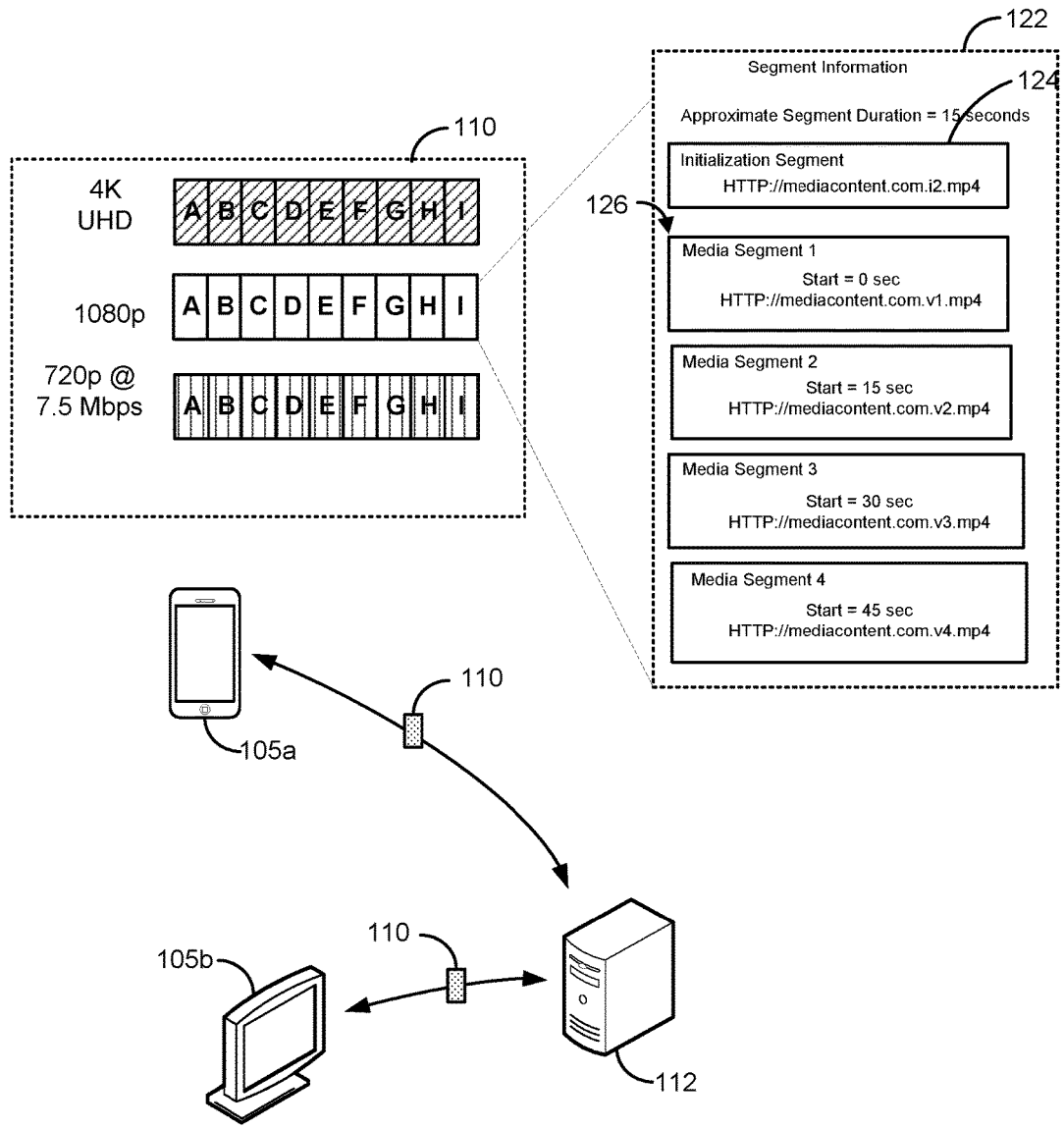
FIG. 1 illustrates an example of a DASH manifest provided for media content playback.

This disclosure describes techniques for implementing static or dynamically generated manifests that include information obtained from initialization fragments of media content files corresponding to different playback options of media content at multiple quality levels. The information obtained from the initialization fragments, also referred to as initialization metadata, is used by a device to initialize its video decoder. When a viewer requests media content (e.g., a movie, a television show, a video, a music track or album, an electronic book, etc.) to stream for playback on a device, the viewer's device uses a manifest file provided by a media server that details fragments, or segments of time, of the media content available at different quality levels. In response to the request for media content, the media server provides a manifest to the viewer device. Since the manifest already includes information obtained from the initialization fragments of the media content file(s), playback of the media content can be initiated by the device without downloading or parsing the initialization fragments as conventionally required, resulting in a reduced time to first frame at the viewer device; an important metric relating to the quality of the user experience. The manifest may also include per-fragment metadata such as per-fragment durations, enabling the viewer device to make fast and precise seeking decisions. Where the request for media content indicates a particular temporal or byte range, the media server may provide a shortened manifest, reducing the amount of memory consumed by the manifest stored at the viewer device. In the following description, a manifest that is generated to include initialization metadata obtained from initialization fragments or additional metadata will be referred to as an enhanced manifest.

In addition, this disclosure describes techniques for segmenting manifests. A manifest such as an enhanced manifest can be segmented prior to receipt of a request from a client device for a manifest or, alternatively, can be segmented in response to the request from the client device. More particularly, the client can request a manifest for a particular fragment range by indicating a particular temporal range (e.g., start time and duration) or range of fragment indices. By providing the client with a segment of a manifest that corresponds to the requested fragment range, the amount of memory consumed by the manifest at the client device can be significantly reduced.

Dynamic Adaptive Streaming over HTTP (DASH), also known as MPEG-DASH, is an adaptive bitrate streaming technique that enables streaming media content to be streamed over the Internet from conventional HTTP servers. In accordance with MPEG-DASH, media content is partitioned into a sequence of small HTTP-based file segments, or fragments, where each segment contains an interval of playback time of the media content. For example, the media content may be a movie, an episode of a television show, or a live broadcast of a sporting event. The media content is made available at a variety of different bitrates in different corresponding sets of segments, where the sets of segments correspond to aligned intervals of playback time. A manifest (e.g., referred to as a Media Presentation Description in ISO/IEC 23009-1) provides information for adaptive streaming of media content by enabling a client device to download media fragments corresponding to the segments from HTTP server(s).

International standard ISO/IEC 23009-1 specifies formats for the manifest and segments for dynamic adaptive streaming of MPEG media over HTTP. FIG. 1 illustrates an example of a DASH manifest provided for media content playback. As shown in FIG. 1, viewer devices 105a and 105b can receive manifest data such as a conventional manifest file 110 from a server 112. Manifest file 110 provides different playback options for media content. The playback options may differ by one or more encoding parameters such as bitrate, resolution, language, codec, etc. In the example of FIG. 1, manifest file 110 indicates fragments for playback of the media content at the 4K UHD, 1080p, and 720p at 5 megabits per second (Mbps) video quality levels (or bitrates). Manifest file 110 includes, for each playback period, for each of the different playback options (e.g., quality levels), segment information 122 for the corresponding playback option. Segment information 122 can include initialization information 124 for an initialization segment of a media content file associated with the corresponding playback option and media segment information 126 for each of the segments (or fragments) of the media content for that period. (An initialization segment will not be present where the corresponding media segments for the playback option are self-initializing.)

The initialization information 124 identifies a location (e.g., Uniform Resource Locator (URL)) of an initialization fragment that contains metadata that can be used by devices to perform initialization for the corresponding playback option for the playback period, while the media segment information 126 describes a corresponding fragment of the media content. The media segment information 126 for each fragment may identify a location of the corresponding media fragment (e.g., URL and byte range), and may also indicate an approximate start time of the corresponding fragment relative to an initial start time of the period of playback of the media content.

The segment information 122 for the corresponding playback option can also indicate an approximate segment duration for playback of fragments of the media content within the period. The DASH standard provides that a duration attribute is optional and, if present, specifies a constant "approximate" duration. In other words, even when present in the DASH manifest, the duration attribute merely specifies an "approximate" duration of the fragment during playback of the media content. In addition, the last segment within the period could be significantly shorter than the other segments within the period. As a result, when a viewer chooses to view a particular portion of the media content such as a specific scene of a movie, the seek time it takes for the viewer device to locate the desired fragment of the media content can be significant.

In addition, to prepare for playback of the media content at the different quality levels, the viewer devices 105a and 105b initialize their respective video decoders using information retrieved from the initialization fragments for the corresponding playback options. More particularly, for each of the playback options (e.g., quality levels), the viewer devices 105a and 105b open and close a Hypertext Transfer Protocol (HTTP) connection, download the initialization fragment, close the HTTP connection, and parse the initialization fragment to extract initialization metadata from the initialization fragment. Where many different quality levels are supported, the time to playback of the first frame in the media content can be substantial.

In accordance with various implementations, a manifest can be statically or dynamically enhanced with additional metadata that reduces the time it takes a client device to initialize its video decoder for playback of the media content, resulting in a reduced time to first frame. More particularly, in accordance with various implementations, initialization metadata can be extracted from initialization fragments of media files corresponding to different playback options. Information including the initialization metadata and/or derived from the initialization metadata can be included directly in the manifest. Initialization metadata can include codec private data, which contains information that is used to decode a stream for the corresponding playback option. Initialization metadata can also include per-fragment metadata. By including per-fragment metadata such as fragment durations directly in the manifest, seeks can be performed more accurately with a reduced seek time.

In one implementation, enhanced manifests are generated according to a segment list format of MPEG-DASH. The segment list format supports a number of features such as a variable group of pictures (GOP) length and variable bitrate (VBR). In addition, the segment list format supports the specification of per-fragment metadata.

Figure 2:
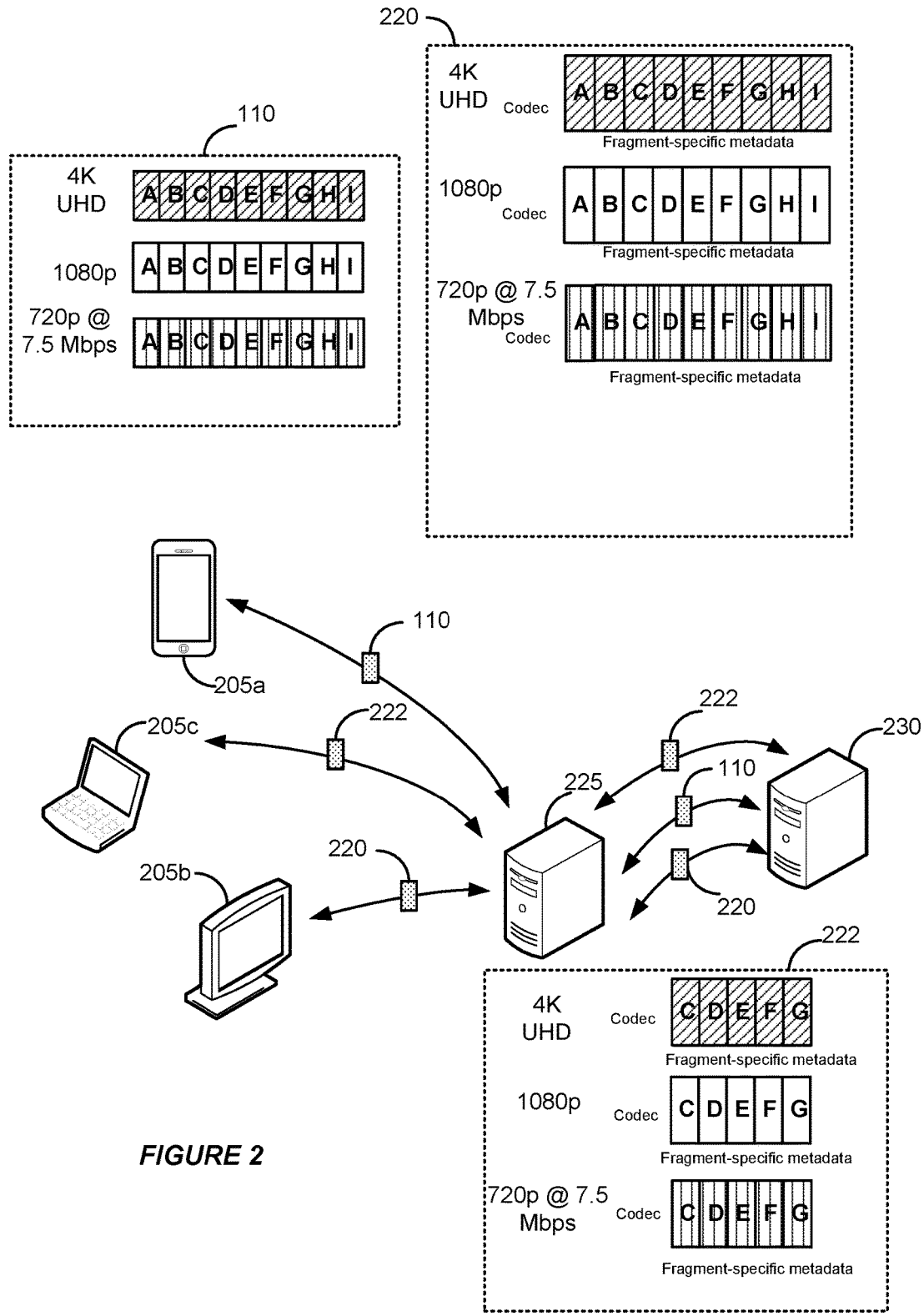
FIG. 2 illustrates an example of a computing environment in which static or dynamic enhanced manifests can be provided for media content playback.

FIG. 2 illustrates an example of a computing environment in which static or dynamically enhanced manifests can be provided for media content playback. As shown in FIG. 2, viewer devices 205a, 205b, and 205c can receive manifest data such as manifest files 110, 220, and 222 (which can be markup files or other types of data structures), respectively, providing playback options for the same media content (e.g., episode #1 of the television show Breaking Bad). Manifest file 110 represents manifest data that includes, for all of the playback periods of the media content, references to locations (e.g., URLs) of initialization fragments corresponding to the different playback options and metadata that enables viewer devices to construct appropriate URLs to access fragments of the media content. Manifest file 220 represents a first enhanced manifest generated from manifest file 110, while manifest file 222 represents a second enhanced manifest that is a subset of manifest file 220. In the depicted implementation, manifest file 220 corresponds to all segments of the media content, while manifest file 222 corresponds to a particular subset of the segments of the media content. For example, manifest file 222 can correspond to a particular temporal or byte range requested by viewer device 205c.

Viewer devices 205a, 205b, and 205c can request playback of the same media content by providing requests to media server 225 to stream the media content for playback on viewer devices 205a, 205b, and 205c. Viewer device 205c includes an additional parameter in its request that requests playback of a specific half hour portion of the media content starting at 12 minutes into the media content.

In this example, viewer device 205a supports only conventional manifests, while viewer devices 205b and 205c support enhanced manifests enabled by the present disclosure. Each of viewer devices 205b and 205c can request an enhanced manifest or opt-in to receive enhanced manifests. Media server 225 can contact manifest server 230 regarding the requests, and manifest files 110, 220, and 222 can be provided by manifest server 230 in communication with media server 225. Alternatively, any of manifest files 110, 220, 222 can be provided independently by media server 225.

An enhanced manifest such as manifest file 220 or 222 can be generated statically or dynamically (e.g., in response to a request from a viewer device), and can be generated by a server such as manifest server 230 or media server 225. In the depicted implementation, manifest files 220 and 222 are generated by manifest server 230.

In the example of FIG. 2, manifest file 110 indicates all of the fragments A-I for playback of the media content at the 4K UHD, 1080p, and 720p at 5 megabits per second (Mbps) video quality levels (or bitrates). That is, manifest file 110 provides fragments for encodings of the media content at three different quality levels. More particularly, manifest file 110 indicates how to request and play back fragments A-I at the 720p at 4K UHD, 1080p, and 720p at 5 megabits per second (Mbps) video quality levels.

Manifest server 230 can generate manifest file 220 from manifest file 110 and initialization metadata obtained from initialization fragments of media files corresponding to the three different quality levels. More particularly, initialization fragments (for all playback periods) can be accessed via URLs or other location data contained in manifest file 110. Thus, manifest file 220 indicates that all of the fragments A-I of the media content can be requested at the 4K UHD, 1080p, and 720p at 5 megabits per second (Mbps) video quality levels. In other words, manifest file 220 indicates how to request and play back fragments A-I at the 720p at 4K UHD, 1080p, and 720p at 5 megabits per second (Mbps) video quality levels. In addition, manifest file 220 includes initialization metadata. In the depicted implementation, the initialization metadata includes codec private data, as well as per-fragment metadata for each of the fragments A-I. For example, the per-fragment metadata can include a fragment duration, fragment byte range, and/or fragment quality level.

Manifest server 230 can generate manifest file 222 indicating that a subset of the segments of the media content can be requested at the 4K ultra-high-definition (UHD), 1080p, and 720p at 5 Mbps quality levels. More particularly, manifest file 222 indicates that fragments C-G of the fragments A-I are available for playback at the 4K ultra-high-definition (UHD), 1080p, and 720p at 5 Mbps quality levels. Thus, manifest file 222 indicates how to request and play back fragments C-G at the 720p at 4K UHD, 1080p, and 720p at 5 megabits per second (Mbps) video quality levels. In addition, manifest file 222 also includes initialization metadata. In the depicted implementation, the initialization metadata includes codec private data, as well as per-fragment metadata for each of the fragments C-G.

Manifest files 110, 220, and 222 can be provided to viewer devices 205a, 205b, and 205c, respectively, by media server 225. As a result, viewer device 205a can request all of the fragments A-I at the 4K ultra-high-definition (UHD), 1080p, and 720p at 5 Mbps quality levels for playback of the media content since those are the fragments and quality levels provided in manifest 110. Viewer device 205b can request all of the fragments A-I at the 4K UHD, 1080p, and 720p at 5 Mbps quality levels for playback of the same media content since those are the fragments and quality levels provided in manifest 220. Viewer device 205c can request fragments C-G at the 4K UHD, 1080p, and 720p at 5 Mbps quality levels for playback of the same media content since those are the fragments and quality levels provided in manifest 222. In the depicted implementation, viewer devices 205b and 205c are configured to parse enhanced manifest files. To initialize their video decoders for playback of the media content, viewer devices 205b and 205c process initialization metadata that is contained within the enhanced manifest files 220 and 222, respectively. The viewer devices 205b and 205c may initiate playback of the media content without downloading or parsing initialization fragments from media files corresponding to the 4K UHD, 1080p, and 720p at 5 Mbps quality levels. In contrast, to initialize its video decoder for playback of the media content, viewer device 205a downloads and parses initialization fragments from media files corresponding to the 4K UHD, 1080p, and 720p at 5 Mbps quality levels via separate HTTP connections. As a result, the time to first frame for viewer device 205a is significantly greater than that for viewer devices 205b and 205c.

In more detail, when viewer devices 205a, 205b, and 205c indicate that streaming of media content is to begin, a request can be provided to media server 225 to provide a manifest file indicating fragments, or segments, of the playback of the media content corresponding to different playback options. Media server 225 provides manifest files 110, 220, and 225 to devices 205a, 205b, and 205c, respectively. Each manifest file includes metadata that allows the viewer device to generate properly formatted requests for specific fragments of the media content. A sequence of fragments together can provide playback of the full media content as depicted at 110 and 220 or, alternatively, can provide playback of a subset of the media content as depicted at 222. Audio portions of the media content can also be provided in fragments. Additional information, such as available subtitles, can also be provided in the manifest file.

Viewer devices 205a, 205b, and 205c can implement heuristic algorithms to determine the quality level of the fragments of the media content to request to provide streaming playback of the media content based on manifest files 110, 220, and 222, respectively. For example, viewer device 205a might be a smartphone running an operating system or software application utilizing a heuristic algorithm that determines which quality level to select fragments at based on information such as the bandwidth of the Internet connection (or other network connection) that viewer device 205a uses to communicate with media server 225 and the hardware resources, such as the central processing unit (CPU) availability or capacity. As the available bandwidth increases and/or CPU availability increases, the heuristic algorithm can request higher-quality fragments of the media content for playback by parsing the manifest file and selecting higher-quality fragments for requests. As the available bandwidth decreases and/or CPU availability decreases, then lower-quality fragments of the media content can be requested for playback. As a result, viewer device 205a determines which fragments to select and request from media server 225 to provide playback of the media content by using the data in manifest file 110. Viewer device 205c might be a laptop computer implementing the same or a different heuristic algorithm for selecting fragments of the media content for playback by using the data in manifest file 222. Similarly, viewer device 205b might be a smart television implementing the same or a different heuristic algorithm for selecting fragments of the media content for playback by using the data in manifest file 220.

Media server 225 can be an edge server of a content delivery network (CDN). Media server 225 can provide fragments of the media content for streaming playback on viewer devices 205a, 205, and 205c, as well as receive fragments from other components of the CDN (e.g., origin servers). In FIG. 2, media server 225 can communicate with manifest server 230, which can be an application server that can be part of or external to the CDN. In some implementations, the functionality of both media server 225 and manifest server 230 can be implemented within the same server, both within the same CDN, or across several servers. Media server 225 can provide information regarding viewer devices 205a. 205b, and 205c making the requests for the manifest files to manifest server 230, and manifest server 230 can use this information to retrieve or generate manifest files 110, 220, and 222.

Manifest server 230 can include information that can be used to retrieve or generate manifest files 110, 220, and 222 for viewer devices 205a, 205b, and 205c, respectively. Additionally, manifest server 230 can use information provided by media server 225 to determine the metadata to include in manifest files 220 and 222. Information maintained at manifest server 230 or provided by media server 225 to manifest server 230 can include or be derived, at least in part, from one or more of the following: metadata pertaining to the media content, request-specific information, and/or device profiles of viewer devices 205a, 205b, 205c.

Metadata pertaining to the media content can include manifest data, which includes references to locations (e.g., URLs and/or byte ranges) at which media and initialization fragments corresponding to the different playback options (e.g., quality levels) can be accessed.

Request-specific information can include or be derived from parameter(s) of a request for media content transmitted by a viewer device. For example, parameters can include an indication that a viewer device is configured to support enhanced manifests, an indication that the viewer device is requesting an enhanced manifest for the specific media content, and/or an indication that the viewer device is interested in a particular temporal or byte range of the media content.

In the depicted implementation, since viewer devices 205b and 205c each support enhanced manifests, viewer devices 205b and 205c can transmit requests that include a first parameter that requests an enhanced manifest for the media content. Viewer device 205c can also provide a second parameter in its request, where the second parameter indicates a fragment range corresponding to a subset of the media fragments of the media content. For example, the fragment range can be requested in the form of a temporal range (e.g., indicated via a start time and time duration) or a byte range (e.g., indicated via a range of fragment indices).

Device profiles of viewer devices 205a, 205b, and 205c can indicate device characteristics such as hardware and/or software capabilities. For example, device characteristics can include, but are not limited to, device type (e.g., smartphone, laptop computer, tablet, HD television), screen size or resolution, operating system, and/or memory capacity. Software capabilities can include, for example, operating system type, operating system version, and/or manifest processing configuration (e.g., whether the device is capable of parsing enhanced manifests).

Device profiles of viewer devices 205a, 205b, and 205c can also indicate device manifest preferences. For example, a device profile of device 205b can indicate that device 205b has opted-in to receive enhanced manifests. Later, when device 205b opts out of receiving enhanced manifests, the device profile can be updated by a server such as manifest server 230. As another example, a device profile of device 205c can indicate that device 205c has requested an enhanced manifest for the media content (e.g., for a specific request) by providing an indication in its request for the media content.

In the depicted implementation, manifest server 230 can be provided a request from media server 225 to retrieve or dynamically generate manifest files corresponding to the requests received from viewer devices 205a, 205b, and 205c to stream the media content. Media server 225 might provide the title, cache key, and/or other type of identifier of the media content to manifest server 230. Manifest server 230 can include metadata such as manifest file 110 indicating the fragments for playback of the video portion of the media content at the 4K UHD, 1080p, 720p at 5 Mbps, and 720p at 7.5 Mbps quality levels.

Since viewer device 205a supports only conventional manifest files, manifest server 230 can retrieve manifest file 110 and provide manifest file 110 to media server 225 to provide to viewer device 205a. Manifest server 230 can determine that viewer device 205b supports enhanced manifest files, and retrieve enhanced manifest file 220 or generate enhanced manifest file 220 from manifest file 110. Viewer device 205c has indicated that it is interested in viewing a half hour of playback time starting at 12 minutes into the media content. Manifest server 230 can determine that viewer device 205c supports enhanced manifest files, and retrieve or generate manifest file 222 that contains metadata pertaining to playback of the requested portion of the media content.

Manifest server 230 can segment enhanced manifest file 220 either prior to receiving a request from media server 225 or dynamically in response to receiving the request. More particularly, manifest server 230 can segment enhanced manifest file 220 along half hour or hour boundaries, and save the portions of manifest file 220 as separate manifests. Alternatively, manifest server 230 can dynamically generate manifest file 222 by obtaining a portion of manifest file 220 pertaining to playback of the requested half hour of media content, which corresponds to fragments C-G of the media content at the different quality levels. For example, each fragment can correspond to 6 minutes of playback content. In the implementation depicted in FIG. 2, missing fragments A-B and H-I cannot be requested by viewer device 205c using manifest file 222 because the requests for them cannot be properly made due to them not being included in manifest file 222. In other implementations, manifest server 230 can retrieve a manifest file that corresponds to a greater period of time (e.g., an hour) than that requested (e.g., a half hour), but is still a much smaller file than manifest file 220.

Figure 3:
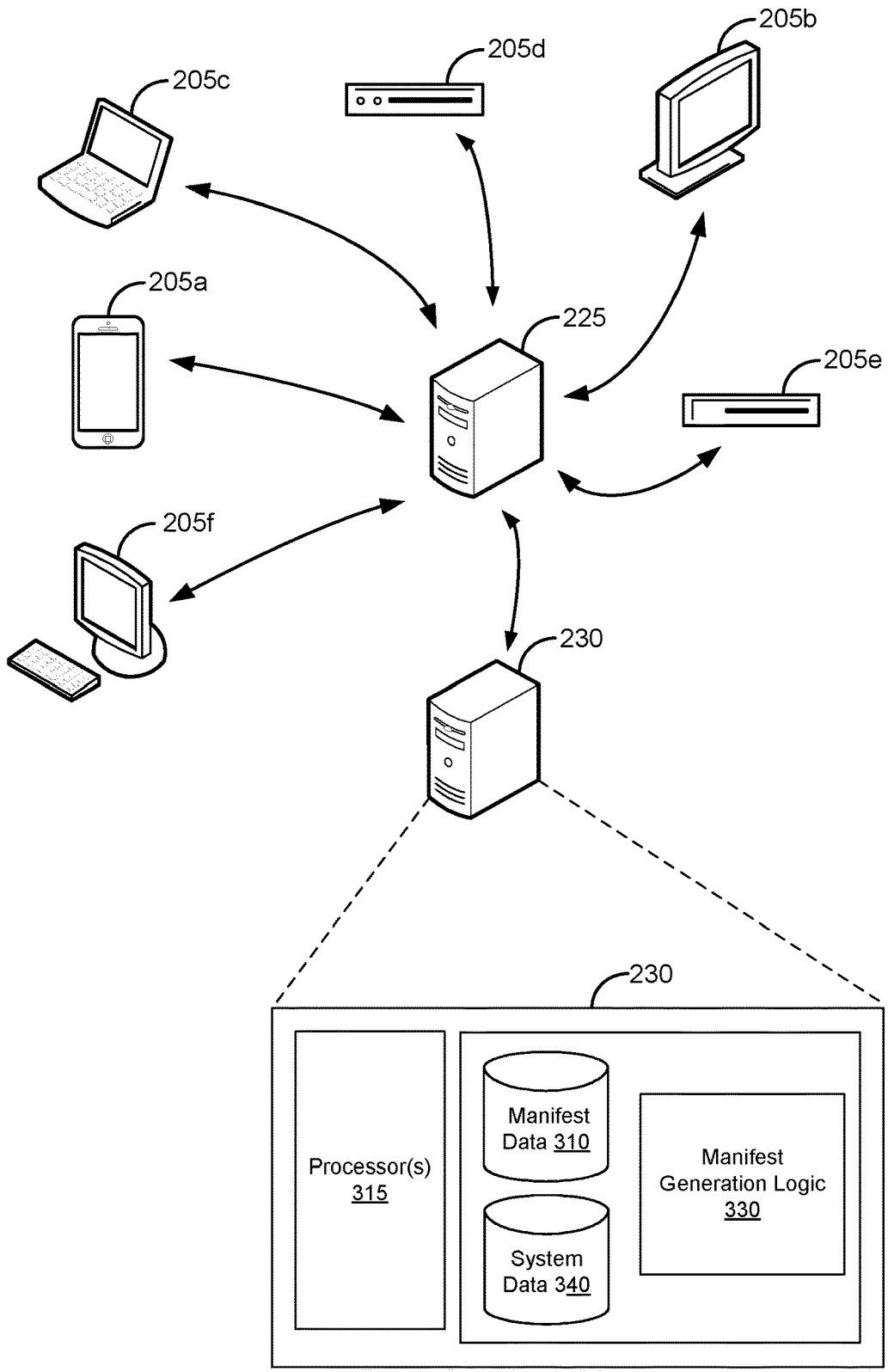
FIG. 3 illustrates an example of a computing environment in which enhanced manifests can be used for media content playback.

FIG. 3 illustrates an example of a computing environment in which enhanced manifests can be used for media content playback. The computing environment of FIG. 3 includes media server 225 which can be used to provide media content for playback on viewer devices 205a-e. Viewer device 205a is a smartphone, viewer device 205b is a television, viewer device 205c is a laptop computer, viewer device 205d is a set-top box, viewer device 105e is a video game console, and viewer device 205f is a desktop computer. Other types of devices such as tablets, wearable devices (e.g., smart watches), virtual reality headsets, etc. may also be included in the computing environment.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 225 and/or manifest server 230 may be part of a content delivery system that conforms to any of a wide variety of architectures. The functionality and components of media server 225 and manifest server 230 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented by one or more of different entities. For example, the functionality to provide playback of media content can be integrated into a video player or software client under control of one entity (e.g., on viewer devices 205a-e), integrated into a separate app from another entity, implemented in an edge server or content server of a CDN, a server of an ISP, etc.

Media server 225 can include various types of logic used to provide media content for playback at viewer devices 205a-f. In FIG. 3, media server can include media content storage for storing fragments of media content and playback handling logic to provide fragments to viewer devices 205a-f.

In addition, manifest server 230 can include various types of logic used to retrieve and/or generate manifest files for facilitating the playback of media content by viewer devices 205a-f. Manifest server 230 also can include one or more processors 315, memory, and other hardware for performing the tasks disclosed herein. Media server 225 and viewer devices 205a-f can also include processors, memory, and other hardware.

Manifest generation logic 330 can use data including manifest data 310, system data 340, and/or enhanced manifest data 220 to statically or dynamically generate manifest files that can be provided to viewer devices 205a-f for playback of media content. Manifest data 310 can include data including details regarding fragments of the video portion of the playback for media content, details regarding fragments of the audio portion of the playback for media content, subtitles, and/or other types of data related to the playback of media content for different playback options. For example, manifest data 310 can include URLs and/or byte ranges associated with media fragments including video fragments and/or audio fragments. System data 240 can include data regarding device profiles (e.g., device characteristics, manifest preferences) and other types of data described herein that can be used to retrieve or generate an appropriate manifest.

Referring back to FIG. 1 and FIG. 2, manifest server 330 may determine based, at least in part, on the system data, whether to provide conventional manifest 110 corresponding to the requested media content, retrieve or generate enhanced manifest 220 corresponding to the requested media content, or retrieve or generate manifest 222 including only a portion of enhanced manifest 220. In accordance with one implementation, segmentation of an enhanced manifest file 220 to generate further "partial" enhanced manifests can be performed statically or dynamically (e.g., in response to viewer device requests), as will be described in further detail below. In some implementations, the data within system data 340 can be dynamic and changing through time and may be provided from a variety of sources. For example, the system data 340 can include request-specific information.

In further detail, referring back to FIG. 1 and FIG. 2, manifest generation logic 330 of manifest server 230 can generate enhanced manifest 220 by identifying locations of initialization fragments of media content files corresponding to the different playback options (e.g., quality levels), downloading the initialization fragments, at least partially parsing the initialization fragments to extract initialization metadata, and generating enhanced manifest file 220 based, at least in part, on manifest data 310 and the extracted initialization metadata. More particularly, enhanced manifest 220 can be generated to include at least a portion of manifest data 310, as well as information including and/or derived from at least a portion of the initialization metadata. Moreover, manifest generation logic 330 of manifest server 230 can generate enhanced manifest 222 by segmenting manifest 220, either statically or dynamically along temporal or byte range boundaries, which may be indicated by viewer device 205c.

In one implementation, manifest data 310 or initialization metadata includes per-fragment quality values. Each quality value is an objective measure of the visual quality of that fragment. The quality value associated with a fragment may be determined based upon characteristics of the fragment, as will be described in further detail below.

Each fragment can be represented by a set of parameters that can be used to determine its associated quality value. The set of parameters can include parameters associated with the fragment and/or its constituent frames. For video fragments, such frame parameters might include, for example, quantization parameters, rate factors, frame size, frame type, what portion of a frame is intra versus predicted, the degree of motion in a frame, whether a frame is black, whether a frame is part of a fade, peak signal-to-noise ratio (PSNR), a codec's internal metric(s) (e.g., Rate Factor in x264 and x265), relative and absolute number of bits spent on intra prediction, motion vectors, residual coding, chroma information, luma information, spatial and temporal frequency distribution, what other frames such frames reference, what frames they are referenced by, position in the fragment, position in a scene, if a frame starts or ends a fragment, Structural Similarity (SSIM), Motion-based Video Integrity Evaluation (MOVIE) index, Tektronix PQA, etc. For audio fragments, such parameters might include, for example, quantization parameters, PSNR, Perceptual Evaluation of Audio Quality (PEAQ), etc. A parameter for a given fragment or group of fragments may not necessarily be derived from its constituent frames but may be any information by which the fragment can be reliably compared and classified in a manner that is predictive of perceived quality.

Figure 4:
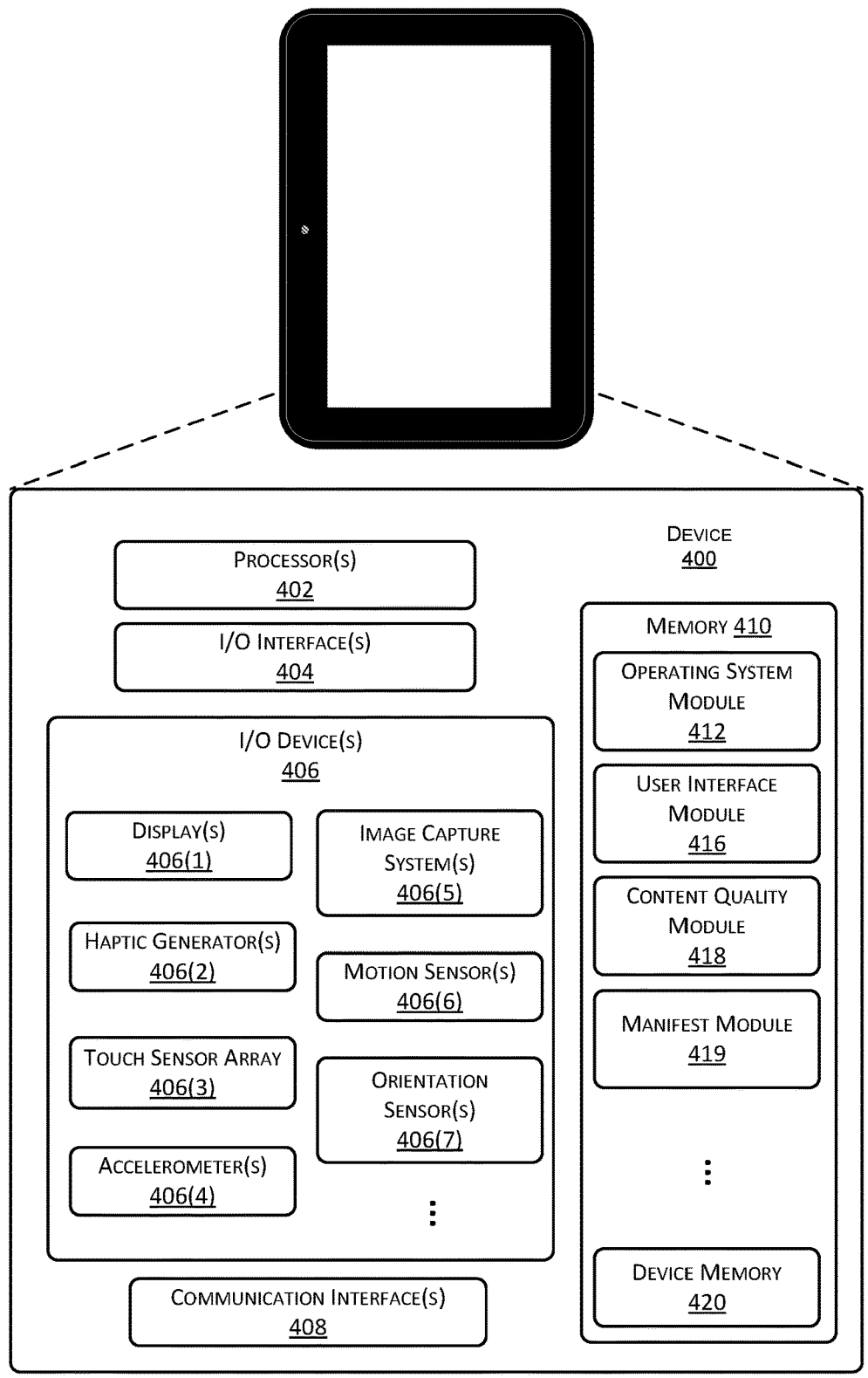
FIG. 4 is a simplified block diagram illustrating an electronic device that may be employed with various implementations.

FIG. 4 is a simplified block diagram illustrating an electronic device that may be employed with various implementations. Device 400 includes one or more single or multi-core processors 402 configured to execute stored instructions (e.g., in device memory 410). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-232 interface, a media device interface, and so forth. I/O interface(s) 404 is coupled to one or more I/O devices 406. The I/O device(s) 406 may include one or more displays 406(1), one or more haptic generators 06(2), a touch sensor array 406(3), one or more accelerometers 206(4), one or more image capture systems 206(5), one or more motion sensors 406(6), one or more orientation sensors 406(7), microphones, speakers, and so forth. The one or more displays 406(1) are configured to provide visual output to the user and may comprise any of a variety of display types including, for example, any type of reflective or transmissive display. Touch sensor array 406(3) may be a capacitive sensor array having a matrix of conductors that are scanned to determine, for example, the location, duration, speed and direction of touch events within the matrix based on changes in electrical capacitance.

Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G or 4G cellular network, a WiFi LAN and a Bluetooth PAN. Device 400 also includes one or more buses or other internal communications hardware or software that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules and other data for the operation of device 400. Memory 410 includes at least one operating system (OS) module 412 configured to manage hardware resources such as I/O interfaces 404 and provide various services to applications or modules executing on processor(s) 402. Memory 410 also includes a user interface module 416, a content rendering module 418, manifest module 419, and other modules.

Manifest module 419 may be configured to parse manifests received from media server. More particularly, device 400 may be configured to parse conventional manifests and/or enhanced manifests. For example, where an enhanced manifest is not available, device 402 may be configured to recognize and parse a conventional manifest. Parsing of an enhanced manifest and playback of the media content may be performed without downloading or parsing initialization fragments corresponding to the different playback options. Furthermore, device 400 need not open (and close) HTTP connections to access the initialization fragments.

In addition, manifest module 419 may be configured to compose and transmit a request to a media server (e.g., edge server) for media content. Manifest module 419 may enable device 402 to request an enhanced manifest for the media content by providing an indication in the request for media content. The request may also include one or more additional parameters such as an indication of a desired fragment range. Similarly, manifest module 419 may enable device 402 to opt-in or out of receiving enhanced manifests (e.g., for media content that is subsequently requested by device 400) by providing an indication in the request for media content or transmitting a separate message to media server or another server.

Content quality module 418 may be configured to select fragments for playback from a manifest based upon factors such as available hardware resources (e.g., memory and/or CPU), current bandwidth, and/or per-fragment quality values within the manifest. Selected fragments may be downloaded for playback via device 402. An example process of switching bitrates and fragment selection during adaptive bit rate streaming will be described in further detail below with reference to FIG. 10.

Memory 410 also includes device memory 420 to store a wide variety of instructions and information using any of a variety of formats including, for example, flat files, databases, linked lists, trees, or other data structures. Such information includes content for rendering and displaying on display 406(1) including, for example, any type of video content. In some implementations, a portion of device memory 420 may be distributed across one or more other devices including servers, network attached storage devices, and so forth.

The logic or computer program instructions used to support the processing of manifests (represented by manifest module 419) may be implemented in a variety of ways. For example, at least some of this functionality may be implemented as part of the code of a video decoder and/or media player operating on device 400. And as mentioned above, implementations are contemplated in which at least a portion of the logic or computer program instructions may reside on a separate platform, e.g., media server 225, manifest server 230, etc. Suitable variations and alternatives will be apparent to those of skill in the art. It will also be understood that device 400 of FIG. 4 is merely an example of a device with which various implementations of the present invention may be practiced, and that a wide variety of other devices types may also be used (e.g., devices 205-a to 205-f). The scope of the invention should therefore not be limited by reference to device-specific details.

Figure 5:
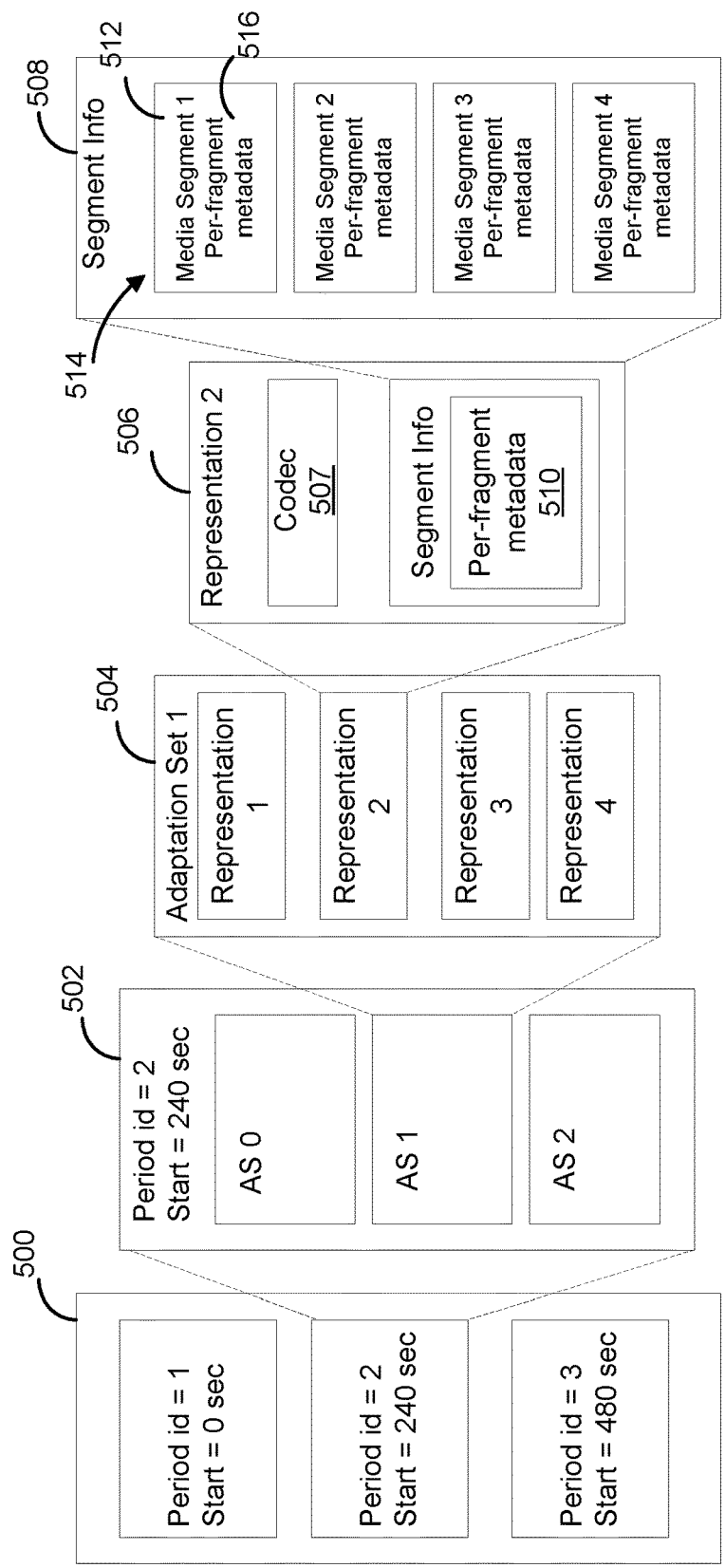
FIG. 5 illustrates an example of a format of an enhanced manifest for media content playback.

FIG. 5 illustrates an example of a format of an enhanced manifest for media content playback. Enhanced manifest 500 can include metadata for a plurality of periods of playback time of media content. In the example depicted in FIG. 5, manifest 500 includes metadata for three different periods. For each period 502, different playback options are represented as one or more adaptation sets 504, where each adaptation set 504 includes metadata for a plurality of representations 506. Each of the representations 506 corresponds to a different one of a plurality of playback options. More particularly, metadata associated with representation 506 enables the media content to be played back via fragments of a media file associated with the corresponding playback option.

In the implementation depicted in FIG. 5, manifest 500 includes, for each representation 506, a codec private data attribute 507 that includes codec private data for the representation. Codec private data includes parameters that are used by a client device to initialize its video decoder to decode a video stream for the corresponding representation 506. For example, codec private data can include High Efficiency Video Coding (HEVC) parameters that are used to decode a video stream encoded by an HEVC/H.265 encoder. HEVC parameters generally include a video parameter set (VPS), a sequence parameter set (SPS), and a picture parameter set (PPS). Codec private data can be represented as a single string or multiple strings.

In addition, segment information 508 for representation 506 includes per-fragment metadata 510 for each of the fragments. Per-fragment 510 metadata can include, but is not limited to, per-fragment duration, per-fragment byte-range, and/or per-fragment quality value. A per-fragment quality value is representative of the visual quality of the fragment as it will be perceived by a viewer. An example of processing per-fragment quality values will be described below with reference to FIG. 10.

As shown in this example, per-fragment metadata 510 can be provided separately for each media segment 512 within segment list 514, as shown at 516. For example, per-fragment metadata 516 can include a quality value that is provided in association with a byte range for the corresponding fragment. An example format for presentation of a quality value is as follows:
<SegmentURL mediarange="20418-28795" q="125"/>

Figure 6:
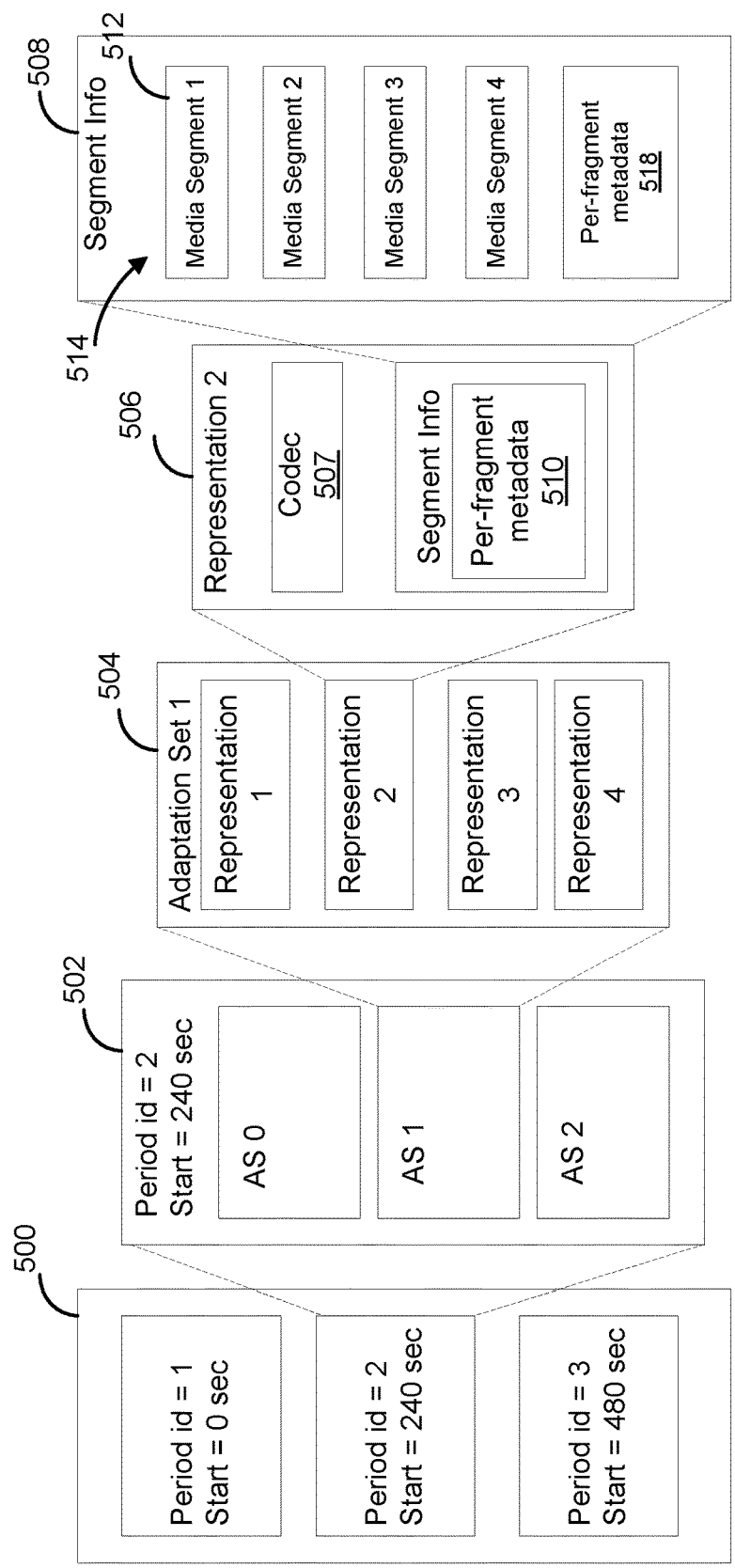
FIG. 6 illustrates an example of a second format of an enhanced manifest for media content playback.

FIG. 6 illustrates an example of a second format of an enhanced manifest for media content playback. In the implementation depicted in FIG. 6, per-fragment metadata 510 for representation 506 is provided for fragments corresponding to media segments 512 in a single section 518 for representation 506. In other words, per-fragment metadata for multiple media segments 512 can be consolidated in section 518 rather than provided separately, as shown in FIG. 5. For example, section 518 can include segment durations and/or byte ranges for each segment of representation 506. In one implementation, section 518 contains media segment byte ranges for representation 506. While section 518 is shown in the implementation depicted in FIG. 6 to be at the end of the code segment for representation 506, section 518 can also be provided at the beginning of the code segment for representation 506 or another location.

Figure 7:
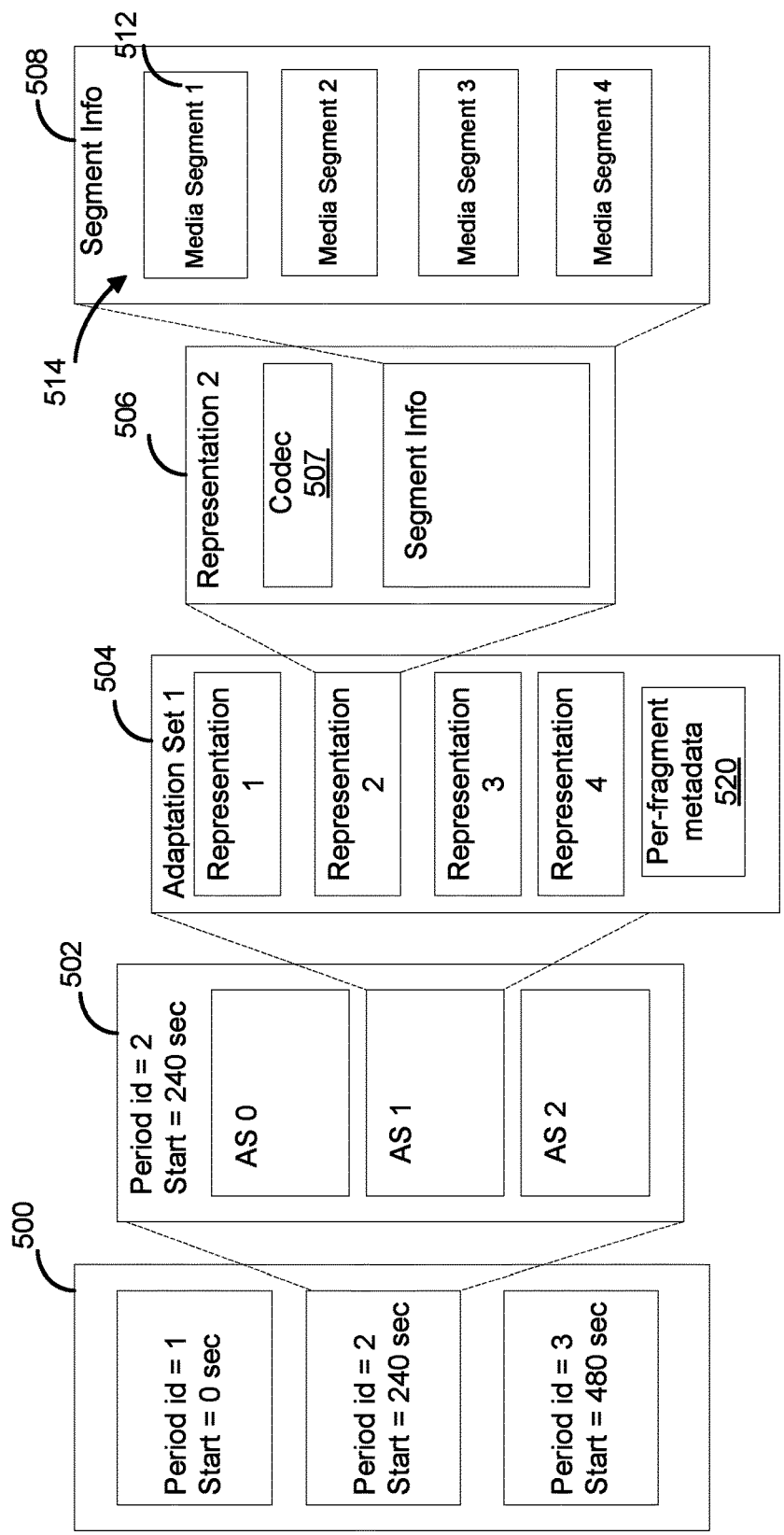
FIG. 7 illustrates an example of a third format of an enhanced manifest for media content playback.

FIG. 7 illustrates an example of a third format of an enhanced manifest for media content playback. In the implementation depicted in FIG. 7, per-fragment metadata 520 is provided for each adaptation set 504. For example, per-fragment metadata 520 can include segment durations and/or byte ranges for each segment of adaptation set 504. In one implementation, per-fragment metadata in per-fragment metadata 520 includes a segment duration for each segment of adaptation set 504. While per-fragment metadata 520 is shown to be located at the end of the code segment for adaptation set 504, per-fragment metadata 520 may also be located at the beginning of the code segment for adaptation set 504 or another location.

As shown in the implementation depicted in FIG. 7, per-fragment metadata 520 can include a segment duration for each segment of the period. In addition, per-fragment metadata 520 can include a timescale attribute that can be used to translate a segment duration of the adaptation set into seconds. An example format for presentation of a segment durations element is as follows:

<SegmentDurations> timescale="30000">
    <s d="60060"/>
    <s d="60060"/>
    <s d="60060"/>
    <s d="60060"/>
</SegmentDurations>

In this example, the segment duration 60060 can be translated into seconds using the timescale 30000.

Referring back to FIGS. 5-7, codec private data can be provided for each representation 506 (for each adaptation set 504 of each period 502 of manifest 500). In one implementation, segment durations are provided per adaptation set 504 at a portion of manifest 500 such as that shown at 520 of FIG. 7, while media segment byte ranges are provided per representation 506 at portion(s) of manifest 500 such as shown at 516 of FIG. 5 or 518 of FIG. 6. For example, segment durations can be provided at the end of a segment of code for adaptation set 504 as shown at 520 of FIG. 7 or, alternatively, segment durations can be provided at the beginning of the segment of code for adaptation set 504. As another example, media segment byte ranges for each representation 506 can be provided within corresponding segment list 514 as shown in FIG. 5 or external to segment list 514 as shown in FIG. 6.

By generating an enhanced manifest, the complexity and size of the manifest can increase substantially. As a result, the amount of memory of a client device consumed by an enhanced manifest can be significantly greater than a conventional manifest. Similarly, the amount of time spent by a client device parsing an enhanced manifest can be significant.

In accordance with various implementations, the size and complexity of an enhanced manifest can be reduced by using an optimized format. More particularly, the optimized format can aggregate per-fragment metadata pertaining to a plurality of segment durations in an aggregated segment duration portion of manifest 500 and aggregate per-fragment metadata pertaining to a plurality of fragment byte ranges in an aggregated byte range portion of manifest 500. For example, an aggregated segment duration portion may be generated for each adaptation set as shown at 520 of FIG. 7, while an aggregated byte range portion may be provided for each representation as shown at 518 of FIG. 6.

In further detail, to facilitate the parsing of an enhanced manifest, an optimized enhanced manifest can eliminate XML tags for a plurality of separate segment durations and aggregate the segment durations within a single string under an element name such as <EncodedSegDurations>. To ensure that segment durations can be parsed and associated with the corresponding fragment, segment durations can be represented with text elements having the same fixed length and can be delimited by a character such as a semicolon, as follows:
<EncodedSegDurations>0000BBB0;0000BBB0; . . . 0000BBB0</EncodedSegDurations>

Similarly, an optimized enhanced manifest can eliminate XML tags for a plurality of separate segment byte ranges and aggregate the segment byte ranges within a single string under an element name such as <EncodedSegList>. To ensure that byte ranges can be parsed and associated with the corresponding fragment, segment byte-ranges can be represented with text elements having the same fixed length and can be delimited by a character such as a semicolon, as follows:
<EncodedSegList>000000000-000006999; . . . 000006999-00000E677</EncodedSegList>

An enhanced manifest can be generated such that per-fragment metadata is provided according to one or more of the implementations depicted in FIGS. 5-7. For example, per-fragment metadata may be provided separately for each segment within segment list 514 of representation 506 as depicted in FIG. 5, may be provided within an element that is within representation 506 but external to segment list 514 of representation 506 as depicted in FIG. 6, and/or may be provided within an element of each adaptation set 504 as depicted in FIG. 7. Moreover, the implementations depicted in FIGS. 5-7 are merely illustrative, and other formats for generating enhanced manifests are possible. Furthermore, the examples of the types of metadata that may be provided in an enhanced manifest described above are merely illustrative, and other types of metadata may also be included in an enhanced manifest.

A specific implementation will now be described with reference to FIG. 2, the computing environment of FIG. 3 the manifest formats of FIGS. 5-7, and the flow diagrams of FIGS. 8, 9, and 10.

Figure 8:
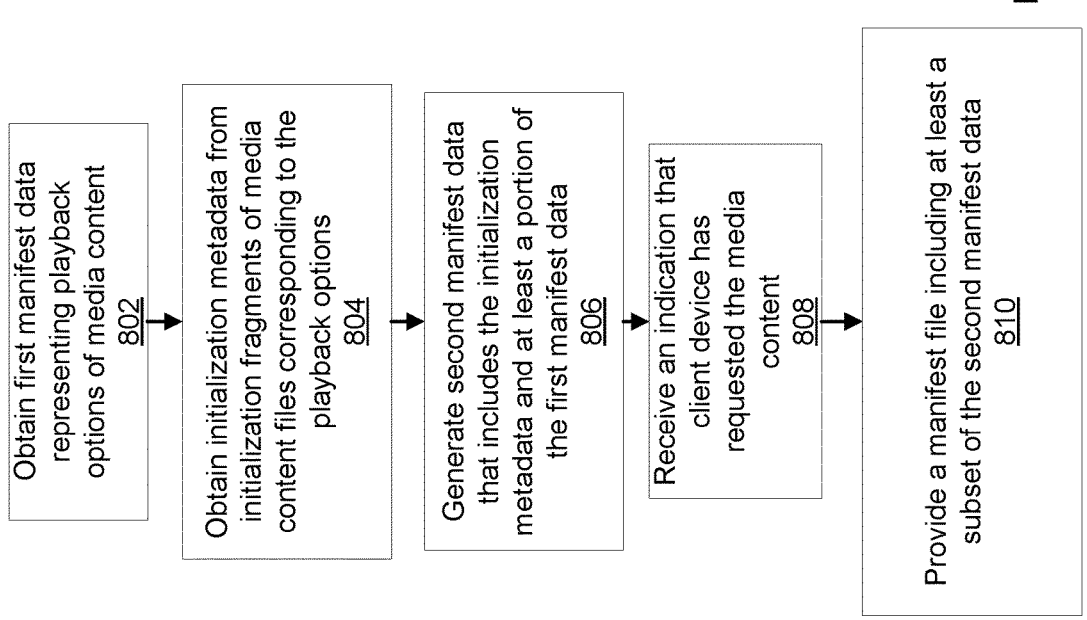
FIG. 8 is a flowchart illustrating a method of providing enhanced manifests for media content playback.
Figure 9:
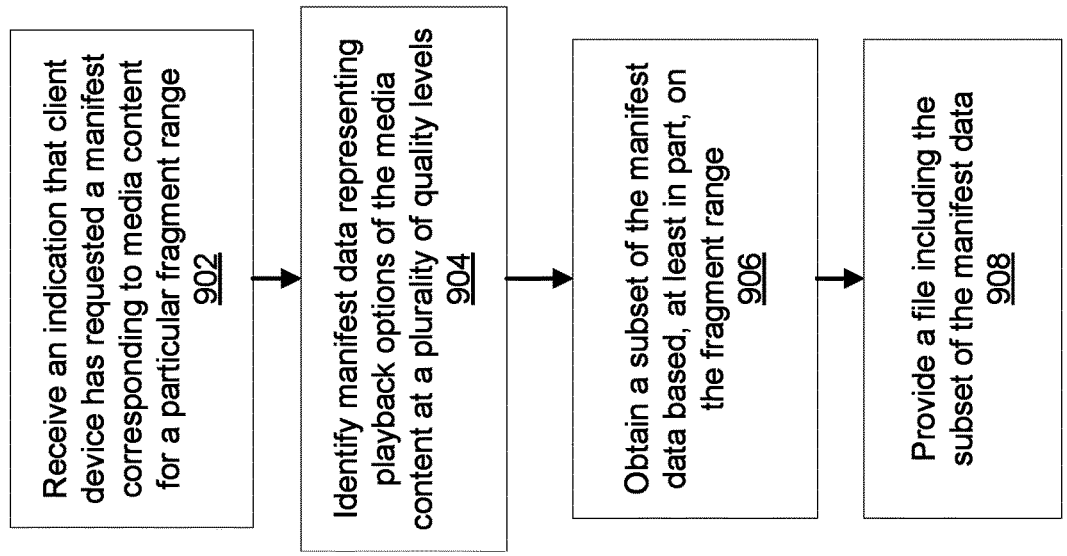
FIG. 9 is a flowchart illustrating a method of performing manifest segmentation for media content playback.

FIG. 8 is a flowchart illustrating a method of providing enhanced manifests for media content playback. First manifest data 110 representing playback options of media content at a plurality of quality levels is obtained at 802, where each of the playback options is associated with a corresponding plurality of media fragments. The first manifest data 110 can indicate locations at which the media fragments associated with each of the playback options can be accessed. In addition, the first manifest data 110 can indicate locations of initialization fragments of media content files corresponding to the playback options. For example, first manifest data 110 can include URLs and/or byte ranges corresponding to media fragments for each of the playback options. In one implementation, first manifest data 110 can include per-fragment quality values that each indicates a visual quality of the corresponding media fragment.

Initialization metadata is obtained from the initialization fragments of media content files corresponding to the playback options at 804. More particularly, for at least one of the playback options, a location of an initialization fragment of a corresponding media content file is ascertained. The initialization fragment is retrieved and parsed to obtain initialization metadata from the initialization fragment of the corresponding media content file. For example, the initialization metadata can include codec private data for at least one of the playback options. The initialization metadata can also include per-fragment metadata such as per-fragment durations and/or quality values for at least one of the playback options.

Second manifest data 220 is generated at 806 based, at least in part, on the first manifest data 110 and the initialization metadata. The second manifest data 220 can include the initialization metadata and at least a portion of the first manifest data 110. The second manifest data 220 need not include the locations of initialization fragments that are contained within the first manifest data 110. Second manifest data 220 can be generated statically or dynamically (e.g., in response to a client request for the media content).

An indication that a client device has requested the media content is received at 808. For example, the client device may request the media content by submitting a request with a parameter indicating that the client device is requesting an enhanced manifest (rather than a conventional manifest). The request may also include an additional parameter that indicates a particular fragment range.

In the implementation depicted in FIG. 8, the client device supports enhanced manifests. The client device may have specifically requested an enhanced manifest for the media content or may have previously opted-in to receive enhanced manifests. Alternatively, a device profile (e.g., device characteristics) may indicate that the client device supports enhanced manifests.

A manifest file including at least a subset of the second manifest data 220 is provided at 810. The manifest file can be generated dynamically (e.g., in response to receiving the indication that the client device has requested the media content). Alternatively, a previously generated manifest file can be retrieved and provided. Since initialization metadata obtained from the initialization fragments of the media content files has been included in the manifest file, the manifest file need not indicate the locations (e.g., URLs) of the initialization fragments of the media content files.

In one implementation, the manifest file can include, for each of the playback options (e.g., representations), codec private data and per-fragment metadata for each of the fragments corresponding to the playback option. The per-fragment metadata can include a duration for the fragment and/or an indication of a quality value for the fragment. In one implementation, the manifest file conforms to an optimized format. More particularly, the manifest file can include, for each adaptation set, a string of text elements having the same fixed length, where each of the text elements represents a duration for a corresponding one of the segments of playback time represented within the adaptation set. In addition, the manifest file can include, for each of the playback options, a string of text elements having the same fixed length, where each of the text elements represents a byte range for a corresponding one of the fragments corresponding to the playback option.

Where the client device has requested media content for a particular fragment range, the manifest file can include only a portion of the second manifest data. The portion of the second manifest data can correspond directly to the fragment range or, alternatively, can correspond to a range of which the fragment range is a subset. An example method of segmenting manifest data will be described in further detail below with reference to FIG. 9.

A conventional manifest file or an enhanced manifest file can be segmented to generate one or more smaller manifest file(s). FIG. 9 is a flowchart illustrating performing manifest segmentation for media content playback. Manifest segmentation can be performed by one or more servers such as edge server 225 and/or manifest server 230. Segmentation of a manifest can be performed prior to receiving a request for media content such that subsets of the manifest are stored for servicing media content requests at a later time. Alternatively, segmentation of a manifest can be performed dynamically in response to a request for media content.

An indication that a client has requested a manifest corresponding to media content for a particular fragment range is received at 902. For example, the indication can be received by edge server 225 as a parameter of the client's request for a manifest corresponding to the media content. As another example, the indication can be received by manifest server 230 from edge server 225. The fragment range can be indicated by a start time and duration or, alternatively, can be identified via indices of a fragment index.

In other embodiments, the client indicates a request for a fragment range (e.g., only a portion of the manifest data for the media content) without indicating a particular fragment range. In other words, the particular fragment range (e.g., temporal range or range of fragment indices) may be implicit rather than explicit. In these instances, edge server 225 assumes that the request is for an initial portion of the manifest data or, alternatively, a subsequent portion of the manifest data (e.g., corresponding to subsequent media fragments) where the client has previously requested a portion of the manifest data for the same media content. Therefore, edge server 225 may ascertain a particular fragment range (e.g., a fixed size temporal range or fixed size range of fragment indices) based, at least in part, upon prior manifest requests for the same media content.

Manifest data representing playback options of the media content at a plurality of quality levels is identified at 904, where each of the playback options is associated with a corresponding plurality of fragments. In one implementation, the manifest data indicates, for each of the playback options, durations and byte ranges for the corresponding fragments. For example, the manifest data may be an optimized enhanced manifest, as described above with reference to FIG. 6 and FIG. 7.

A subset of the manifest data is obtained at 906 based, at least in part, on the particular fragment range and a manifest file including the subset of the manifest data is provided at 908. For example, the subset of the manifest data may correspond directly to the particular fragment range requested by the client device, as described above with reference to manifest 222 of FIG. 2. The subset of the manifest data may be obtained from a conventional manifest or an enhanced manifest, which may be in an optimized format. In one implementation, the subset of the manifest data is enhanced and/or optimized prior to providing the manifest at 908. In this manner, the client device can receive a smaller manifest that will consume less memory and CPU resources.

Segmentation of a manifest can be performed dynamically such that a manifest file including the subset of the manifest data that has been requested is generated in response to the indication of the client request. Thus, the manifest file can include only the subset of the manifest data that pertains to the requested fragment range. In other words, the manifest file can exclude the remainder of the manifest data of the enhanced manifest other than the subset of the manifest data pertaining to the requested fragment range.

Alternatively, the manifest can be segmented according to fixed same size temporal ranges or fixed same size byte ranges. For example, the manifest data within the manifest can be segmented along one hour boundaries. Thus, each of a plurality of subsets of the manifest data can be stored in a different one of a plurality of files. Where segmentation is performed prior to receipt of a request from the client, the manifest file provided to the client may not correspond directly to the requested fragment range. In this example, the client device may have indicated that they are interested in a particular half-hour segment of the media content, and the client device may be provided a manifest file that corresponds to an hour temporal range that includes the half-hour segment.

Segmentation can include partitioning code within the manifest data. For example, segmentation can be performed between or within adaptation sets, representations, and/or segment lists. In addition, codec private data associated with the playback options may be segmented. For example, the codec private data associated with only a subset of the playback options may be provided within a manifest file. Where the manifest is an optimized enhanced manifest such as that described above with reference to FIG. 6 and FIG. 7, segmentation can include partitioning strings representing durations and/or byte ranges corresponding to a pertinent fragment range. For example, where a string represents byte ranges for a particular playback option of the media content, the string can be partitioned to obtain only a portion of the text elements in the string. As another example, where a string represents durations for a particular adaptation set, the string can be partitioned to obtain only a portion of the text elements in the string.

In one implementation, the client device may be configured to request initial or subsequent portions of the manifest data for the media content. Where the client has previously requested a portion of the manifest data for the media content from edge server 125 and the client is requesting another portion of the manifest data for the media content, edge server may not provide codec private data in the manifest. Where the client device has requested a portion of the manifest data for the media content rather than a complete manifest, the client device may maintain copies of content of previously received manifests for the media content and/or an indication of those portions of the manifest data that it has received.

As described above, the client device can be configured to opt in to receive enhanced manifest data or request an enhanced manifest for media content. After the client device receives a manifest including enhanced manifest data such as manifest 220 or 222, the client device can use a portion of the manifest data to initiate playback of the media content.

Figure 10:
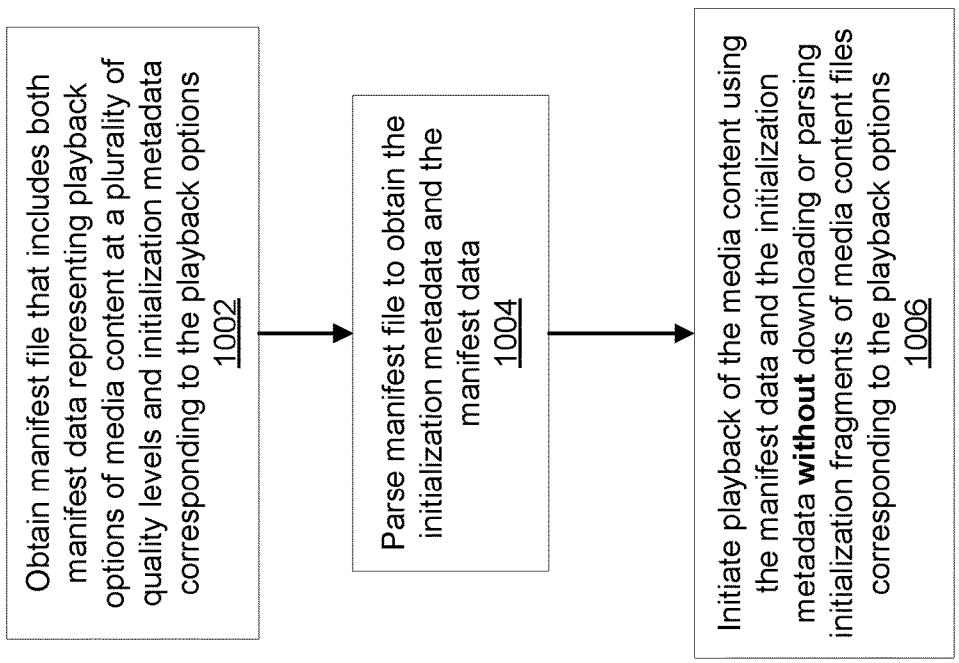
FIG. 10 is a flowchart illustrating a method of processing an enhanced manifest for media content playback.

FIG. 10 is a flowchart illustrating a method of processing an enhanced manifest for media content playback. A client device obtains a manifest file including manifest data representing playback options of media content at a plurality of quality levels at 1002 and initialization metadata corresponding to the playback options, where each of the playback options is associated with a corresponding plurality of fragments. The initialization metadata can include, for at least one of the playback options: codec private data and per-fragment metadata for each of the fragments for the playback option. For example, the per-fragment metadata can include an indication of a duration for the fragment and/or an indication of a quality value for the fragment. In one implementation, the manifest file does not indicate locations of the initialization fragments of the media content files corresponding to the playback options.

Where the manifest file is an optimized enhanced manifest, the manifest file can include strings that each consolidates information for multiple fragments or segments. In one implementation, the manifest file can include for at least one adaptation set, a string including text elements having the same fixed length, where each text element represents a duration for a corresponding one of a plurality of segments of playback time that is represented within the adaptation set, where each of the segments corresponds to a fragment for each of the playback options represented by the adaptation set. In addition, the manifest file can include for at least one of the playback options, a string including text elements having the same fixed length, where each text element represents a byte range for a corresponding one of the fragments for the playback option.

The client device parses the manifest file to obtain the initialization metadata and the manifest data at 1004. As described above, the initialization metadata can include codec private data and per-fragment metadata such as durations and/or quality values. Where the manifest file is an optimized enhanced manifest, the client device may, prior to initiating playback of the media content, obtain a string representing either durations or byte ranges from the manifest and store the string (e.g., without parsing the string). For example, prior to initiating playback of the media content, the client device may obtain a string representing byte ranges for one of the playback options from the manifest file and store the string without parsing the string to ascertain each of the byte ranges.

Next, the client device initiates playback of the media content at 1006 using the initialization metadata and the manifest data without downloading or parsing initialization fragments of media content files corresponding to any of the playback options, as will be described in further detail below. During playback, the client device may perform additional parsing of a portion of the initialization metadata such as a string representing byte ranges or fragment durations.

The client device may select a media fragment corresponding to one of the playback options. Typically, the decision to switch bitrates during adaptive bitrate streaming is based upon current bandwidth and the assumption that a fragment that consumes more bits will look better. As a result, where there is available bandwidth, the client device will typically request the larger fragment. In one implementation, the client device selects the media fragment based, at least in part, on a current bandwidth and media fragment quality values. To illustrate this selection process, an example of a portion of an enhanced manifest is set forth below:

<Rep 5000k>
  <SegmentURL mediaDuration="90000-100000" Q="10">
  <SegmentURL mediaDuration="100000-110000" Q="2">
</Rep 5000k>
</Rep 10000k>
  <SegmentURL mediaDuration="200000-220000" Q="10">
  <SegmentURL mediaDuration="220000-240000" Q="6">
</Rep 10000k>

In this example, the first segment of the media content corresponds to a black screen, while the second segment of the media content corresponds to an explosion. The 10000k representation is typically assumed to be of a higher quality since it includes twice as many bits as the 5000k representation. However, rather than assuming that the fragment that includes a greater number of bits will provide a better viewing experience for the user, in one implementation, the client device compares the quality values of the fragments for the corresponding segment to ascertain an objective measure of the visual quality of the corresponding fragments. The client device ascertains that, for the first segment of the media content, the quality value for the first fragment for the 5000k representation is the same as the quality value for the first fragment of the 10000k representation. As a result, the client device selects the first fragment of the 5000k representation since it can be displayed with fewer bits than the first fragment of the 10000k representation while providing the same visual quality as the first fragment of the 10000k representation. This additional bandwidth can be used for another fragment for which the additional bits will provide a better viewing experience. Upon ascertaining that the second fragment of the 10000k representation has a quality value of 6 and the second fragment of the 5000k representation has a quality value of 2 (assuming a higher quality value indicates a higher visual quality), the client device selects the second fragment of the 10000k representation since there is a significant visual upgrade.

The client device can initialize its video decoder using the codec private data corresponding to the selected playback option (e.g., bit rate). In addition, where the initialization metadata is in an optimized format, the media player of the client device can retrieve a string representing byte ranges and/or a string representing durations for use during playback.

In one implementation, the client device can retrieve a string representing byte ranges for one of the playback options. To retrieve a particular fragment, the client device can ascertain an offset that corresponds to the fragment based, at least in part, on the length of an individual text element within the string. For example, where each text element is 10 characters in length and the client device is interested in the 7$^{th}$ segment (or fragment), the offset may be 70 characters. Where a single text character such as a semicolon separates the text elements from one another, the offset is 77 characters. In this example, the desired text element representing the desired byte range may be located at 78-87 characters within the string.

During playback of the media content, the text element at the offset can be obtained from the string and parsed to ascertain the byte range for the desired fragment. The fragment corresponding to the byte range can be downloaded, and playback of the fragment can then be initiated. By delaying the parsing of the strings of an optimized enhanced manifest to runtime, the time to first frame can be significantly reduced. Furthermore, by limiting parsing efforts to only the text element that corresponds to the fragment that the client device is interested in accessing next, the amount of parsing performed by the client device during runtime is minimal.

Similar benefits can be obtained during seek time. For example, where a user attempts to seek to a particular time within the media content in relation to the start of the media content playback, the media player can use the fragment durations for the playback option to accurately identify the desired fragment. In one implementation, the media player of the client device can retrieve the string that contains the durations for the playback option. The string can be parsed prior to playback or during playback, as set forth above. To ascertain the duration for a particular fragment, an offset within the string that corresponds to the fragment can be ascertained based, at least in part, upon the length of the text elements within the string.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
   obtaining, at one or more servers, manifest data representing playback options of media content at a plurality of quality levels, each of the playback options being associated with a corresponding plurality of media fragments;
   ascertaining, by the servers from the manifest data, locations of initialization fragments of media content files corresponding to the playback options;
   retrieving, by the servers, the initialization fragments of the media content files corresponding to the playback options at the corresponding locations;
   parsing, by the servers, the initialization fragments of the media content files corresponding to the playback options to obtain initialization metadata;
   generating, by the servers, a Dynamic Adaptive Streaming over HTTP (DASH) manifest file that includes the initialization metadata, at least a portion of the manifest data, and per-fragment metadata for the plurality of media fragments of the media content, the DASH manifest file being configured to enable a client device to initiate playback of the media content without downloading the initialization fragments, the per-fragment metadata including a quality value associated with a first byte range for a corresponding media fragment of the plurality of media fragments;
   receiving, by the servers, an indication that a client device has requested the media content; and
   providing, by the servers, the DASH manifest file.

2. The method as recited in claim 1, wherein the initialization metadata comprises, for at least one of the playback options:
   a) codec private data; and
   b) per-fragment metadata for each of the media fragments for the playback option, the per-fragment metadata including at least one of: an indication of a duration for the media fragment or an indication of the quality value for the media fragment.

3. The method as recited in claim 1, wherein the DASH manifest file comprises, for at least one of the playback options, a string that includes a plurality of text elements separated from one another by a text character, each of the text elements representing a second byte range for a corresponding one of the media fragments for the playback option, the text elements for each of the playback options having the same length.

4. The method as recited in claim 1, wherein the initialization metadata comprises, for an adaptation set, an indication of a duration for each one of a plurality of segments of playback time that is represented within the adaptation set; and
wherein the DASH manifest file comprises, for at least one adaptation set, a string including a plurality of text elements separated from one another by a text character, each of the text elements representing the duration for each of the segments of playback time that is represented within the adaptation set, each of the segments corresponding to a media fragment for each of the playback options represented by the adaptation set, the text elements having the same length.

5. The method as recited in claim 1, wherein the DASH manifest file is generated in response to receiving the indication that the client device has requested the media content.

6. A computing device, comprising:
one or more processors and memory configured to:
obtain first manifest data representing playback options of media content at a plurality of quality levels, each of the playback options being associated with a corresponding plurality of media fragments;
retrieve initialization fragments of media content files corresponding to the playback options;
parse the initialization fragments to obtain initialization metadata;
generate second manifest data that includes the initialization metadata, at least a portion of the first manifest data, and per-fragment metadata for the plurality of media fragments of the media content, the per-fragment metadata including a quality value associated with a byte range for a corresponding media fragment of the plurality of media fragments;
receive an indication that a client device has requested the media content; and
provide a manifest file including at least a subset of the second manifest data.

7. The computing device as recited in claim 6, the memories and processor being further configured to:
receive an indication that the client device has opted in to receive enhanced manifest data.

8. The computing device as recited in claim 6, the memories and processor being further configured to:
receive an indication that the client device has requested enhanced manifest data for the media content.

9. The computing device as recited in claim 6, the memories and processor being further configured to:
determine that the client device supports enhanced manifests based, at least in part, on a device profile indicating characteristics of the client device.

10. The computing device as recited in claim 6, wherein the manifest file is generated in response to receiving the indication that the client device has requested the media content.

11. The computing device as recited in claim 6, wherein the manifest file comprises, for at least one adaptation set, a string including a plurality of text elements separated from one another by a text character, each of the text elements representing a duration for each one of a plurality of segments of playback time that is represented within the adaptation set, each of the segments corresponding to a media fragment for each of the playback options represented by the adaptation set, the text elements having the same length.

12. The computing device as recited in claim 6, at least a portion of the initialization metadata being within at least one of:
a segment list of the manifest file;
a representation of the manifest file; or
an adaptation set of the manifest file.

13. The computing device as recited in claim 6, the memories and processor being further configured to:
receive an indication that the client device has requested a manifest for the media content for an indicated fragment range;
wherein providing a manifest file including at least a subset of the second manifest data includes providing only a portion of the second manifest data.

14. The computing device as recited in claim 13, wherein the portion of the second manifest data corresponds to the indicated fragment range.

15. The computing device as recited in claim 6, the memories and processor being further configured to: determine that the client device supports enhanced manifests based at least in part on hardware characteristics or software characteristics of the client device.

16. The computing device as recited in claim 6, the memories and processor being further configured to:
remove XML tags for each media fragment of the plurality of media fragments, each media fragment corresponding to a separate segment duration; and
aggregate the plurality of media fragments and segment durations within a single string element name.

17. A computing device, comprising:
one or more processors and memory configured to:
obtain a manifest file, the manifest file including manifest data representing playback options of media content at a plurality of quality levels, initialization metadata corresponding to the playback options, and per-fragment metadata for a corresponding plurality of media fragments of the media content, the initialization metadata including codec private data, each of the playback options being associated with the corresponding plurality of media fragments, the per-fragment metadata including a quality value associated with a first byte range for a corresponding media fragment of the plurality of media fragments;
parse the manifest file to obtain the initialization metadata and the manifest data; and
initiate playback of the media content using the manifest data and the initialization metadata without downloading or parsing initialization fragments of media content files corresponding to the playback options.

18. The computing device as recited in claim 17, the processors and memory being further configured to:
perform at least one of:
opt in to receive enhanced manifest data; or
request an enhanced manifest for the media content.

19. The computing device as recited in claim 17, wherein the initialization metadata further comprises, for at least one of the playback options, an indication of a duration for each of the media fragments for the playback option.

20. The computing device as recited in claim 17, wherein the initialization metadata comprises, for at least one adaptation set, a string including a plurality of text elements separated from one another by a text character, each of the text elements representing a duration for each one of a plurality of segments of playback time that is represented within the adaptation set, each of the segments corresponding to a fragment for each of the playback options represented by the adaptation set, the text elements having the same length.

21. The computing device as recited in claim 17, wherein the initialization metadata comprises a string including a plurality of text elements separated from one another by a text character, each of the text elements representing a duration for a corresponding one of the media fragments for at least one of the playback options, the text elements having the same length.

22. The computing device as recited in claim 17, wherein the manifest file comprises, for at least one of the playback options, a string that includes a plurality of text elements separated from one another by a text character, each of the text elements representing a second byte range for a corresponding one of the media fragments for the playback option, the text elements for each of the playback options having the same length.

23. The computing device as recited in claim 22, wherein the computing device is further configured to:
    for at least one of the playback options,
      prior to initiating playback of the media content:
        obtaining the string corresponding to the playback option from the manifest file; and
        storing the string; and
      during playback of the media content:
        retrieving the string corresponding to the playback option;
        ascertaining an offset within the string for a particular media fragment based, at least in part, on the length of the text elements;
        obtaining the text element at the offset;
        parsing the text element to ascertain the second byte range for the particular media fragment;
        downloading the media fragment corresponding to the byte range; and
        initiating playback of the media fragment.

24. The computing device as recited in claim 17, at least a portion of the initialization metadata being within at least one of:
    a segment list of the manifest file;
    a representation of the manifest file; or
    an adaptation set of the manifest file.

25. The computing device as recited in claim 17, wherein the manifest file does not indicate locations of the initialization fragments of the media content files corresponding to the playback options.

\* \* \* \* \*